(12) United States Patent
Baden et al.

(10) Patent No.: US 10,806,269 B2
(45) Date of Patent: Oct. 20, 2020

(54) ADJUSTABLE FURNITURE TRACK SYSTEM

(71) Applicant: Sauder Manufacturing Co., Archbold, OH (US)

(72) Inventors: Christopher R. Baden, Wauseon, OH (US); Anthony D. Warncke, Archbold, OH (US); Joshua D. Storrer, Archbold, OH (US)

(73) Assignee: Sauder Manufacturing Co., Archbold, OH (US)

( * ) Notice: Subject to any disclaimer, the term of this patent is extended or adjusted under 35 U.S.C. 154(b) by 300 days.

(21) Appl. No.: 15/958,673

(22) Filed: Apr. 20, 2018

(65) Prior Publication Data

US 2019/0082854 A1    Mar. 21, 2019

Related U.S. Application Data

(60) Provisional application No. 62/561,296, filed on Sep. 21, 2017.

(51) Int. Cl.
| | | |
|---|---|---|
| A47C 19/02 | (2006.01) | |
| A47C 19/20 | (2006.01) | |
| F16B 12/56 | (2006.01) | |
| A47C 19/00 | (2006.01) | |

(52) U.S. Cl.
CPC .......... *A47C 19/021* (2013.01); *A47C 19/005* (2013.01); *A47C 19/20* (2013.01); *A47C 19/207* (2013.01); *F16B 12/56* (2013.01); *A47C 19/024* (2013.01); *A47C 19/025* (2013.01)

(58) Field of Classification Search
CPC ..... A47C 19/005; A47C 19/02; A47C 19/021; A47C 19/022; A47C 19/024; A47C 19/025; A47C 19/20; A47C 19/202; A47C 19/205; A47C 19/207; A47C 19/22; F16B 12/54; F16B 12/56
USPC ..... 5/282.1, 285–290, 292, 296–298, 2.1, 8, 5/9.1
See application file for complete search history.

(56) References Cited

U.S. PATENT DOCUMENTS

| | | | | |
|---|---|---|---|---|
| 2,261,820 | A * | 11/1941 | Zimtbaum | F16B 12/60 5/297 |
| 2,425,927 | A * | 8/1947 | Elrad | F16B 12/60 5/288 |
| 2,648,074 | A * | 8/1953 | Jonas | F16B 12/60 5/296 |
| 2,654,101 | A * | 10/1953 | Norris | A47F 7/30 5/287 |
| 3,161,894 | A * | 12/1964 | Short | F16B 12/58 5/296 |
| 6,167,579 | B1 | 1/2001 | Kopish | |
| 6,983,494 | B1 | 1/2006 | Jannetides | |

(Continued)

*Primary Examiner* — Robert G Santos
(74) *Attorney, Agent, or Firm* — McGarry Bair PC

(57) ABSTRACT

An apparatus and method towards an adjustable furniture track system comprising a set of vertical supports extending in a substantially vertical direction and including at least one vertical channel defining a lateral opening and defining an interior wall within a set of vertically-spaced pins connected with the interior wall, the set pins extending in a lateral direction less than the lateral opening. At least one bracket including a set of connectors receivable in the vertical channel and configured to engage with the set of vertically-spaced pins, wherein the at least one bracket is laterally movable within the vertical channel between a first position and a second position.

20 Claims, 8 Drawing Sheets

(56) References Cited

U.S. PATENT DOCUMENTS

| | | |
|---|---|---|
| 7,089,609 B2 | 8/2006 | Jannetides |
| 7,111,341 B2 | 9/2006 | Hennings et al. |
| 7,774,872 B2 | 8/2010 | Sanders, Jr. |
| 8,136,183 B1 * | 3/2012 | Jannetides ........... A47C 19/005 5/282.1 |
| 8,650,680 B1 * | 2/2014 | Jannetides ........... A47C 19/005 5/282.1 |
| 9,185,990 B2 | 11/2015 | Cacioppo |
| 2006/0107457 A1 * | 5/2006 | Jannetides ........... A47C 15/002 5/9.1 |
| 2018/0347609 A1 * | 12/2018 | Haley .................... A47B 83/04 |
| 2019/0082854 A1 * | 3/2019 | Baden .................... A47C 19/04 |

* cited by examiner

ADJUSTABLE FURNITURE TRACK SYSTEM

CROSS-REFERENCE TO RELATED APPLICATION

This application claims the benefit of U.S. Provisional Patent Application No. 62/561,296, filed Sep. 21, 2017, which is incorporated herein by reference in its entirety.

BACKGROUND

Articles of furniture can be configured to convert between various arrangements, depending on the room in which the furniture is located, or the needs of the user of the furniture. Adjustable furniture systems enable users to create spaces suitable to the needs and aesthetic desires of the user.

In certain environments such as a dorm room or bedroom, adjustable furniture can enable more than one bed to be placed in arrangements in which the beds are aloft of each other or for a bed to be placed above a desk area or the like. In some instances, adjustable furniture systems require additional tools, or more than one user to assemble or adjust, such as when vertically-adjusting a component, due to interactions or limitations of the connections between furniture components.

BRIEF DESCRIPTION

In one aspect, the disclosure relates to an adjustable furniture track system comprising a set of vertical supports extending in a substantially vertical direction and including at least one vertical channel defining a lateral opening and defining an interior wall within, a set of vertically-spaced pins connected with the interior wall, the set pins extending in a lateral direction less than the lateral opening. At least one bracket including a set of connectors receivable in the vertical channel and configured to engage with the set of vertically-spaced pins, wherein the at least one bracket is laterally movable within the vertical channel between a first position wherein the set of connectors is engaged with and supported by the set of vertically-spaced pins, and a second position wherein the at least one bracket is vertically movable within the vertical channel past the set of vertically-spaced pins.

In another aspect, the disclosure relates to a method of manufacturing an adjustable furniture system, the method comprising forming a vertically extending channel in a vertically extending support, the channel defining a lateral opening and opposing sidewalls, and connecting a set of vertically-spaced pins that extend laterally within the vertical channel, wherein the set of vertically-spaced pins do not fully extend between the opposing sidewalls, defining a continuous vertically extending movement track of the channel.

DETAILED DESCRIPTION

Figure 1:
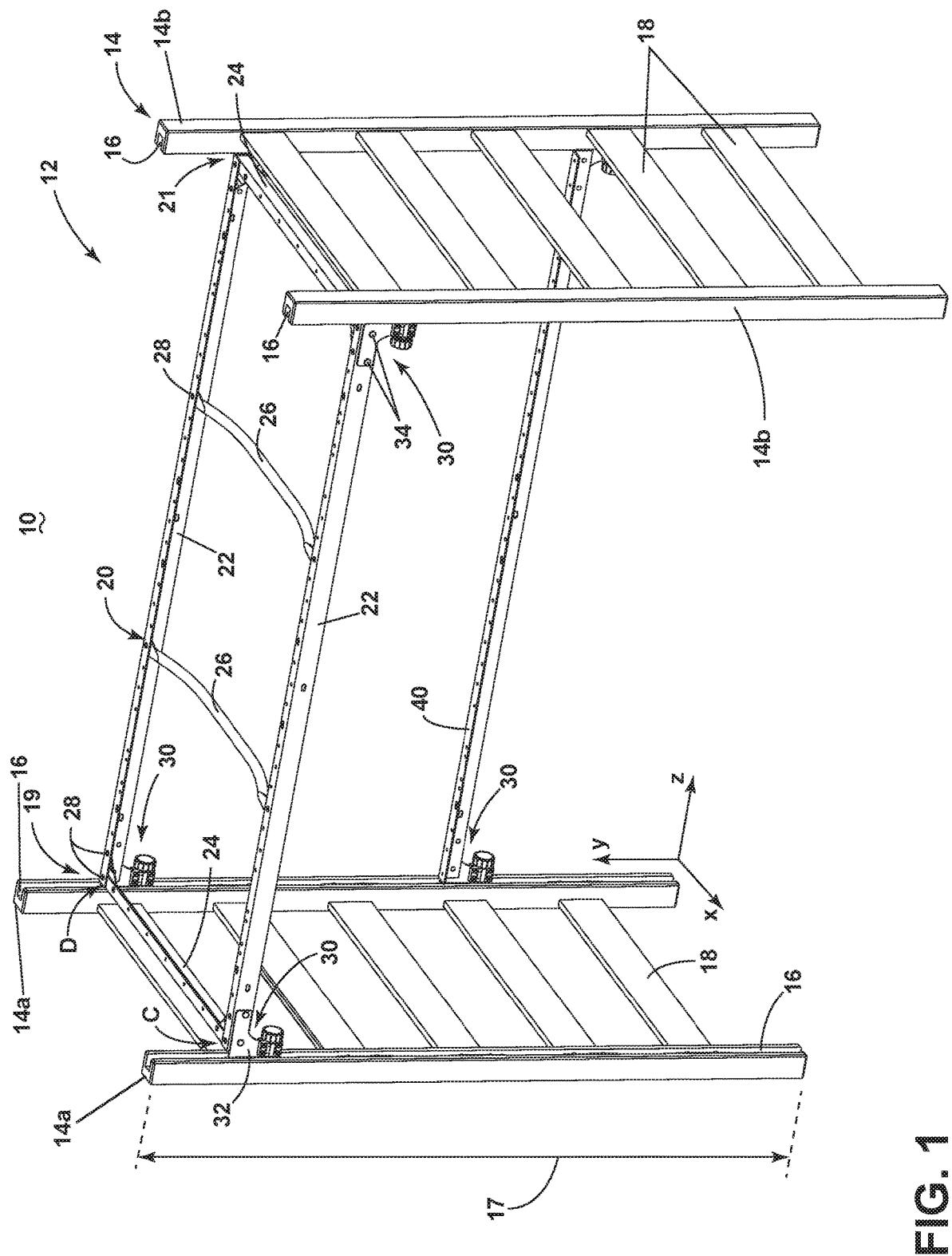
FIG. 1 is a perspective view of an adjustable furniture track system in the form of a bed.

Aspects of the present disclosure may be implemented in any environment wherein an adjustable furniture system, such as a bed frame, shelving unit, or the like, can be adjusted by utilizing a track system for connecting, coupling, supporting, or adjusting a vertically-supported element. For purposes of this description, such an adjustable furniture track system will be generally referred to as a bed frame; however embodiments of the disclosure can be equally suitable for any adjustable furniture system in a residential, industrial, or medical setting.

As used herein, a set of vectors will be used to describe orientation of an article of furniture. For ease of understanding, a coordinate axis system is included to describe aspects of the disclosure. As used here, "X" will refer to a lateral direction or axis, such as parallel to the ground and in a direction of inward and outward. Additionally, "Y" will refer to a vertical axis or direction (e.g. upward and downward) orthogonal to the X axis, and "Z" will refer to another horizontal axis or direction orthogonal to both the X axis and the Y axis.

Additionally, all directional references (e.g., radial, axial, proximal, distal, upper, lower, upward, downward, left, right, lateral, front, back, top, bottom, above, below, vertical, horizontal, clockwise, counterclockwise, etc.) are only used for identification purposes to aid the reader's understanding of the present disclosure, and do not create limitations, particularly as to the position, orientation, or use of the present disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. Further, "a set" as used herein can include any number of the respectively described elements, including only one element. The exemplary drawings are for purposes of illustration only and the dimensions, positions, order and relative sizes reflected in the drawings attached hereto can vary.

FIG. 1 is a perspective illustration of an adjustable furniture track system 10. The adjustable furniture system 10 is illustrated by way of non-limiting example as an adjustable bed 12 or "loft-style" bed frame. A set of vertical supports 14, extending in a vertical direction (Y), can include a first pair of vertical supports 14a and a second pair of vertical supports 14b forming four corners of the adjustable bed 12. As shown, the set of vertical supports 14 can extend along a vertical length 17, shown in the Y direction. Each of the first and second pair of vertical supports 14a, 14b can include at least one vertical channel 16 extending vertically along at least a portion of the set of vertical supports 14, and is illustrated as extending along the entire vertical length 17 of the set of vertical supports 14. While illustrated as extending along the entire vertical length 17 of each of the first and second pair of vertical supports 14a, 14b, it should be understood that the extent of the vertical channel 16 within each of the first and second pair of vertical supports 14a, 14b can vary and is shown for illustrative purposes only and not meant to be limiting.

One or more lateral cross members 18 can couple each of the vertical supports of the first and second pair of vertical supports 14a, 14b to each other, and are shown extending between respective pairs of vertical supports 14a, 14b along the X direction. Each of the first and second pair of vertical supports 14a, 14b are shown including five lateral cross members 18, but it should be understood that any number of lateral cross members 18 is contemplated. While shown as substantially rectangular, the lateral cross members 18 can be any type of rod, bar, or connecting member utilized for stabilizing each of the first and second pair of vertical supports 14a, 14b. The lateral cross members as shown are for illustrative purposes only and not meant to be limiting. Collectively, the first pair of vertical supports 14a and the lateral cross members 18 connecting them can be a first bed end 19, while the second pair of vertical supports 14b and the lateral cross members 18 connecting them can be an opposing second bed end 21.

A mattress support 20, can include one or more side rails 22 (illustrated here as two side rails 22), extending between a first side end 19 and a second side end 21 in a Z direction between the first and second pair of vertical supports 14a, 14b. The mattress support 20 can further include a pair of end rails 24 extending in the X direction between the side rails 22 and proximate the first and second bed ends 19, 21. The mattress support 20 can further include stabilizing slats 26 extending in the X direction between the side rails 22 and coupled to each of the side rails 22. The mattress support 20 can be held together by fasteners, including, but not limited to, frame screws 28, welding, rivets, or the like.

One or more brackets 30 is coupled to the each side rail 22, each pair of end rails 24, or a combination thereof. As shown, the mattress support 20 can include four brackets, each coupled at a corner or intersection of the side rails 22 with the pair of end rails 24. The bracket 30 can have a body 32 formed from a flat sheet or rigid material, by way of non-limiting example metal. Fasteners, by way of non-limiting example a pair of bolts 34, welding, or the like, can couple the bracket 30 via the body 32 to, for example, a side rail 22.

It is further contemplated that at least one additional stabilizer bar 40 can extend in the Z direction between the first and second pair of vertical supports 14a, 14b. As shown, the stabilizer bar 40 can be positioned relative to opposingly arranged vertical supports 14, such as a single first vertical support 14a from the first bed end 19 and a single second vertical support 14b from the second bed end 21. Each stabilizer bar 40 is much like a single side rail 22 and can include a bracket 30 in the same manner as the side rails 22. In one non-limiting example, a stabilizer bar 40 can be included to provide increased rigidity or structural integrity to the adjustable furniture track system 10, for example, to prevent or reduce torqueing of the supports, vertical supports 14, or the like, of the adjustable bed 12.

In one non-limiting example of the adjustable furniture track system 10, at least a portion of the bracket 30 of the mattress support 20 can be received at, or within, the vertical channel 16 of a respective set of vertical supports 14. Similarly, in another non-limiting example of the adjustable furniture track system 10, at least a portion of a similar bracket 30 of the stabilizer bar 40 can be received at, or within, the vertical channel 16 of a respective set of vertical supports 14.

Figure 2:
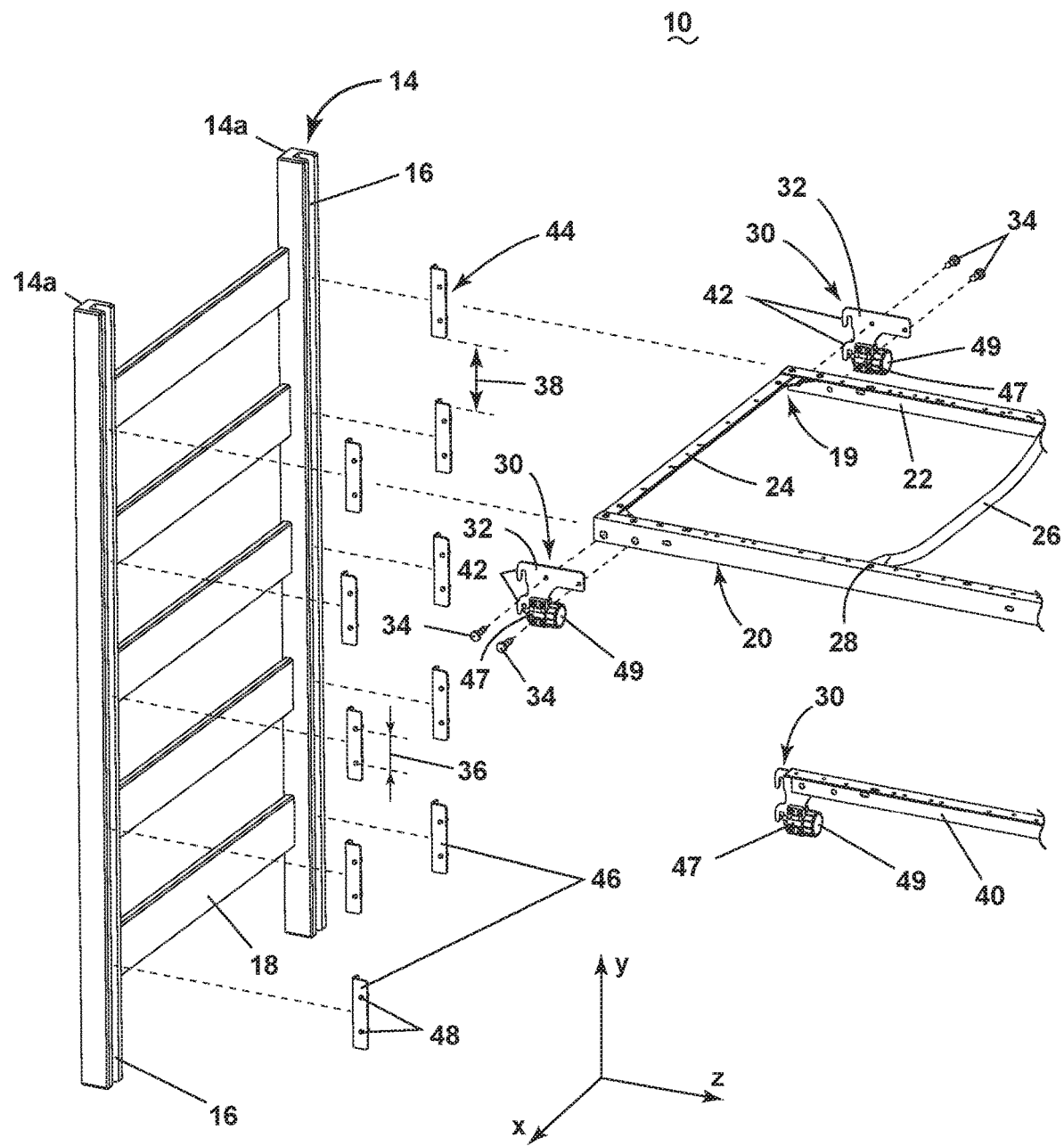
FIG. 2 is a partially exploded view of the adjustable furniture track system with brackets and support track segments exploded away from the bed frame of FIG. 1 according to an aspect of the disclosure herein.

Turning to FIG. 2, a partially exploded perspective view of the adjustable furniture system 10 more clearly illustrates the use of the brackets 30. Two brackets 30 are shown exploded from the mattress support 20 and the first pair of vertical supports 14a. A set of connectors 42, which can be by way of non-limiting example hooks as illustrated, extends from the body 32 of the at least one bracket 30. In this example, the connectors 42 can be at least a portion of the brackets 30 received at, or within, the vertical channel 16 of the respective set of vertical supports 14. While two vertically spaced connectors 42 (e.g. along the Y direction) are shown, any number of connectors 42 or arrangements can be included in aspects of the disclosure.

Additionally support tracks 44 are shown exploded from the vertical channel 16 within the set of vertical supports 14. There may be any number of support tracks 44, preferably at least one for each bracket 30. In one non-limiting example, the each support track 44 can extend along a vertical segment or length (e.g. in the Y direction) in the vertical channel 16. As shown, the each support track 44 can further include a set of vertically-spaced pins 48 extending from the support track 44 in the X direction. In this example, the each support track 44 can be at least partially received within the respective vertical channel 16. It is further contemplated that a vertical spacing 36 of a set of vertically-spaced pins 48 can correspond with or match a vertical spacing between adjacent connectors 42 of a single bracket 30, or vice versa. While two connecting pins 48 and two connectors 42 are shown for each support track 44, any number of connectors 42 and corresponding pins 48 are contemplated as long as the set of connectors as described herein are configured to allow vertical engagement or disengagement of the a bracket 30 from the set of vertically-spaced pins 48.

The support track 44 can include multiple segmented support tracks 46 in the form of L-brackets. Each of the multiple segmented support tracks 46 can be fixedly disposed or positioned relative to the respective vertical support 14 or channel 16 to define a set of spaced predetermined heights at which to receive the at least one bracket 30 with a corresponding side rail 22 or the stabilizer bar 40. As described herein, each of the set of vertically-spaced pins 48 can be vertically spaced a first predetermined distance 36 to correspond with the predetermined heights. The predetermined heights are determined by a vertical spacing of the multiple segmented support tracks 46 spaced at a second predetermined distance 38, where the first predetermined distance 36 is not equal to the second predetermined distance 38. It is further contemplated that the first and second predetermined distances 36, 38 are evenly spaced along the set of vertical supports 14.

While multiple segmented support tracks 46 are shown, a continuous single support track 44 is also contemplated. The set of vertically-spaced pins 48 as described herein can be spaced along the continuous single support track 44 with predetermined spacing relative to the spacing of the connectors 42 on the at least one bracket 30 or vice versa as described herein. In another example, all spaced pins 48 on a continuous support track 44 can include additional adjustable heights for the at least one bracket 30 between any vertically adjacent pins 48.

A carrier 47 can extend from the body 32 of the bracket 30. The carrier 47 can engage, or be formed to hold, a retaining device 49 used to affix the mattress support 20 to the set of vertical supports 14. The retaining device 49 can be used to adjust the mattress support 20 to any predetermined height as described herein.

Figure 3:
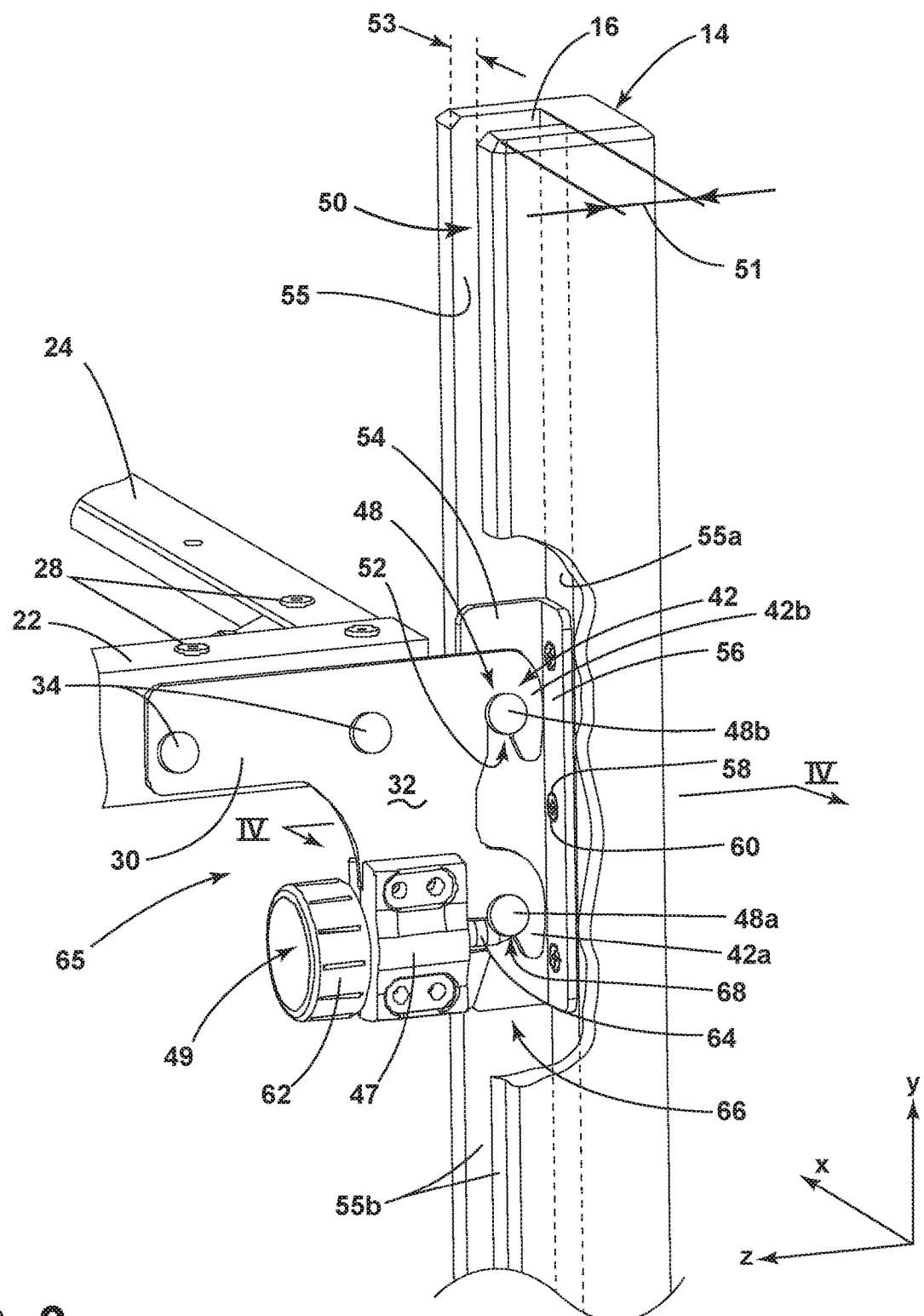
FIG. 3 is an enlarged view of one of the brackets from FIG. 2 coupled to a vertical support having a channel where the view includes a cutout portion.

Turning to FIG. 3, an enlarged perspective view of the bracket 30 from FIG. 2 is shown received within the channel 16 of one of the set of vertical supports 14. As illustrated, a portion of the vertical support 14 is cut away for viewing the support track 44 mounted within the vertical channel 16. It can more clearly be seen that the vertical channel 16 provided within the set of vertical supports 14 extends, within the set of vertical supports 14, a depth 51 and defines a lateral opening 50 having a width 53. An interior wall 55 defining a mounting surface 55*a*, such as a rear wall spaced from the lateral opening 50, and opposing sidewalls 55*b* is located opposite sides of the lateral opening 50.

The support track 44 is in the form of an L-bracket. As shown, a first vertical support 54 of the "L" shape includes the set of vertically-spaced pins 48 and a second vertical support 56 of the "L" shape includes a set of holes 58. The first vertical support 54 and the second vertical support 56 can be perpendicular to each other, such that the supports 54, 56 can be in contact with the respective sidewall 55*b* and mounting surface 55*a*. In one non-limiting example, the channel 16 can include a depression for receiving the support track 44, such that the support track can be received in a flush arrangement with the respective sidewall 55*b* and mounting surface 55*a*. A set of mounting screws 60 can extend through the respective set of holes 58 for mounting the support track 44 to the mounting surface 55*a*. While three holes 58 are illustrated, it should be understood that the number of holes and screws shown is for illustrative purposes and not meant to be limiting.

The carrier 47 is mounted to or formed with the body 32 of the bracket 30. It is contemplated that the carrier 47 is a separate piece mounted to the body 32 via fasteners, or formed with the body 32 in production by way of non-limiting example using 3D printing, die-casting, or injection molding. The carrier 47 engages, supports, or carries the retaining device 49. The retaining device can include a knob 62 from which a retaining pin 64 extends through the carrier 47 in the Z direction. As shown, the retaining pin 64 can be received at or within the channel 16 or proximate to the connectors 42, while the knob 62 is spaced from the retaining pin 64 by at least the carrier 47.

The set of connectors 42 can include a first connector 42*a* and a second connector 42*b*. The set of vertically-spaced pins 48 can include a first pin 48*a* and a second pin 48*b*. When bracket 30 is in a first position 65, such as an engaged position (as shown), the first connector 42*a* can be received over and coupled with the first pin 48*a* and the second connector 42*b* can be received over and coupled with the second pin 48*b*. In this sense, the set of connectors 42 has at least partially received the corresponding set of vertically-spaced pins 48 by way of an open end 52 of the hook-like structure. It will be understood that during engagement, a user will lift, move, or otherwise adjust the bracket 30, body 32, or set of connectors 42 relative to the set of vertically-spaced pins 48. As the set of connectors 42 are similarly oriented, that is, having the hook-like structures similarly configured relative to the bracket 30 such that each open end 52 is facing the −Y direction, a single movement of the bracket 30, body 32, or set of connectors 42 downward (e.g. in the Y direction) can operably engage the set of connectors 42 about the set of vertically-spaced pins 48 simultaneously.

Non-limiting aspects of the disclosure can be included wherein the bracket 30, body 32, or set of connectors 42 can be held, locked, retained, or otherwise constrained relative to a correspondingly engaged support track 44 or set of vertically-spaced pins 48. In this sense, aspects of the disclosure can prevent accidental or intentional disengagement of the set of connectors 42 from the support track 44 or set of vertically-spaced pins 48. In one non-limiting example, the retaining pin 64 can be configured or adapted to further engage at least one of the set of vertically-spaced pins 48, by way of non-limiting example the first pin 48*a* in a locked position 66, as shown in FIG. 3. The locked position 66 can be defined as a position wherein the retaining pin 64 has been transitioned or translated in the Z direction toward the channel 16, such that the retaining pin 64 at least partially closes the open end 52 of the at least one vertically-spaced pin 48. In this sense, the retaining pin 64 in the locked position 66 prevents the bracket 30 or connector 42 from disengaging the at least one pin 48*a*. As show, the retaining pin 64 in the locked position 65 can extend along an underside 68 of the first pin 48*a*.

Figure 4:
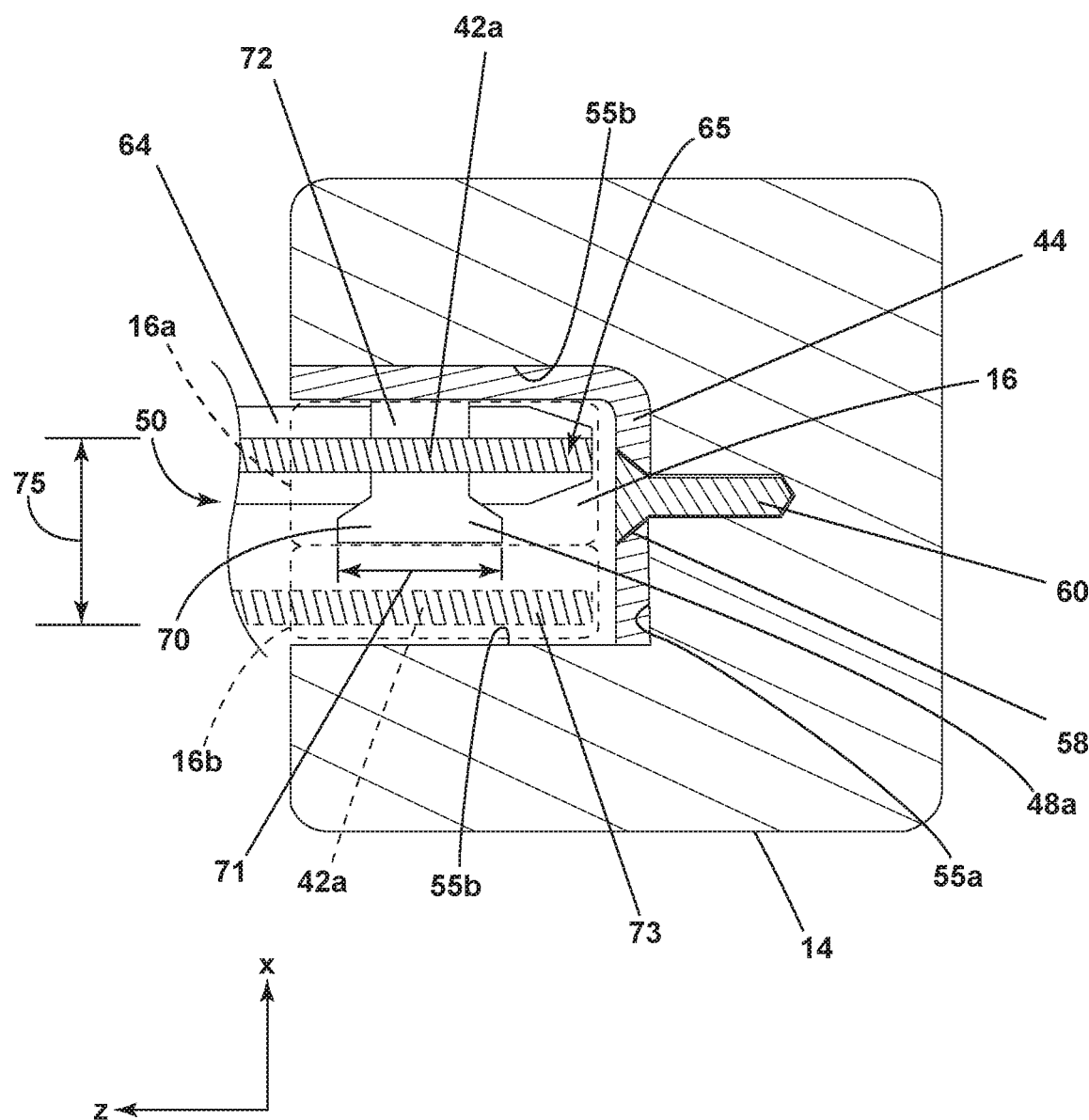
FIG. 4 is a cross-sectional view along line IV-IV from FIG. 3

FIG. 4 illustrates a cross-sectional top view taken along line IV-IV of FIG. 3. It can more clearly be seen that the set of vertically-spaced pins 48 includes at least one pin, by way of non-limiting example the first pin 48*b*, that terminates in a boss 70 having a larger outer radial dimension (shown as a diameter 71) than the rest of the pin 48*a*. The first connector 42*a* extends over an upper surface or upper side 72 of the first pin 48*a*. The first connector 42*a* is prevented from slipping off of the first pin 48*a* in the −X direction by at least a portion of the boss 70 when the at least one bracket is in the first position 65. For understanding, FIG. 4 illustrates a portion of the retaining pin 64 underlying the first pin 48*a*.

The vertical channel 16 defines a vertically extending support pin track 16*a*, outlined in a dashed line, wherein vertical movement of bracket 30, set of connectors 42, or the like will be at least partially impeded by the set of spaced support tracks 44 or the set of vertically-spaced pins 48. It will be understood that at least a partial vertical movement of the bracket 30 or set of connectors 42 is intended, extended movement between spaced support tracks 44 or sets of vertically-spaced pins 48, such as along the full length 17 of the vertical support 14, can be retrained, impeded, or otherwise interrupted by at least a set of vertically-spaced pins 48 in the support pin track 16*a*.

The vertical channel 16 can further define a vertically extending movement track 16*b*, also outlined in dashed line and not impeded by the set of vertically-spaced pins 48 (for example, the portion of the vertical channel 16 not overlying the support pin track 16*a*). The vertical channel 16, the width 53 of the channel 16, the support pin track 16*a*, or the like, can be configured or adapted such that the set of connectors 42 can be freely movable in the Y direction when received in the movement track 16*b*. In one non-limiting example, the movement track 16*b* can be unimpeded along the full length 17 of the vertical support 14. For example, FIG. 4 further illustrates a dotted outline of the second connector a second position 73, where the second position 73 is within the movement track 16*b*. In this example, the bracket 30 or the set of connectors 42 are at least laterally moveable in the X direction (and shown by arrows 75) between the support pin track 16*a* to the movement track 16*b*. While in the second position 73, the at least one bracket 30 or set of connectors 42 are vertically movable within the vertical channel 16.

In order to laterally move the bracket 30 between the first and second positions 65, 73, a user can first move the bracket 30 vertically upward creating a space above the boss 70 and then move the bracket 30 laterally 75 from the first position 65 (e.g. within the support pin track 16*a*) to the second position 73 (e.g. within the movement track 16b) while the connectors 42 remain within the vertical channel 16. Stated another way, the set of brackets 30 or the set of connectors 42 can be disengaged from the set of vertically-spaced pins 48 in an upward (+Y direction) and lateral (−X direction) set of disengagement movements, such that the set of brackets 30 or the set of connectors 42 are freely moveable in the Y direction for readjusting a height of the bracketed element (e.g. the mattress support 20, stabilizer bar 40). A reverse set of movements can likewise be utilized to engage or re-engage the set of brackets 30 or the set of connectors 42 with a corresponding set of vertically-spaced pins 48 somewhere along the length 17 of the vertical support 14. In both examples of the engaging movement or disengaging movements, it will be understood that the set of vertical supports 14 will not need to be moved or adjusted, and can remain substantially where they are disposed, while allowing the mattress support 20, or the like, supported by the set of vertically-spaced pins 48 and brackets 30, to be vertically adjusted along the length 17 without the brackets 30 being removed from the channel 16.

Figure 5:
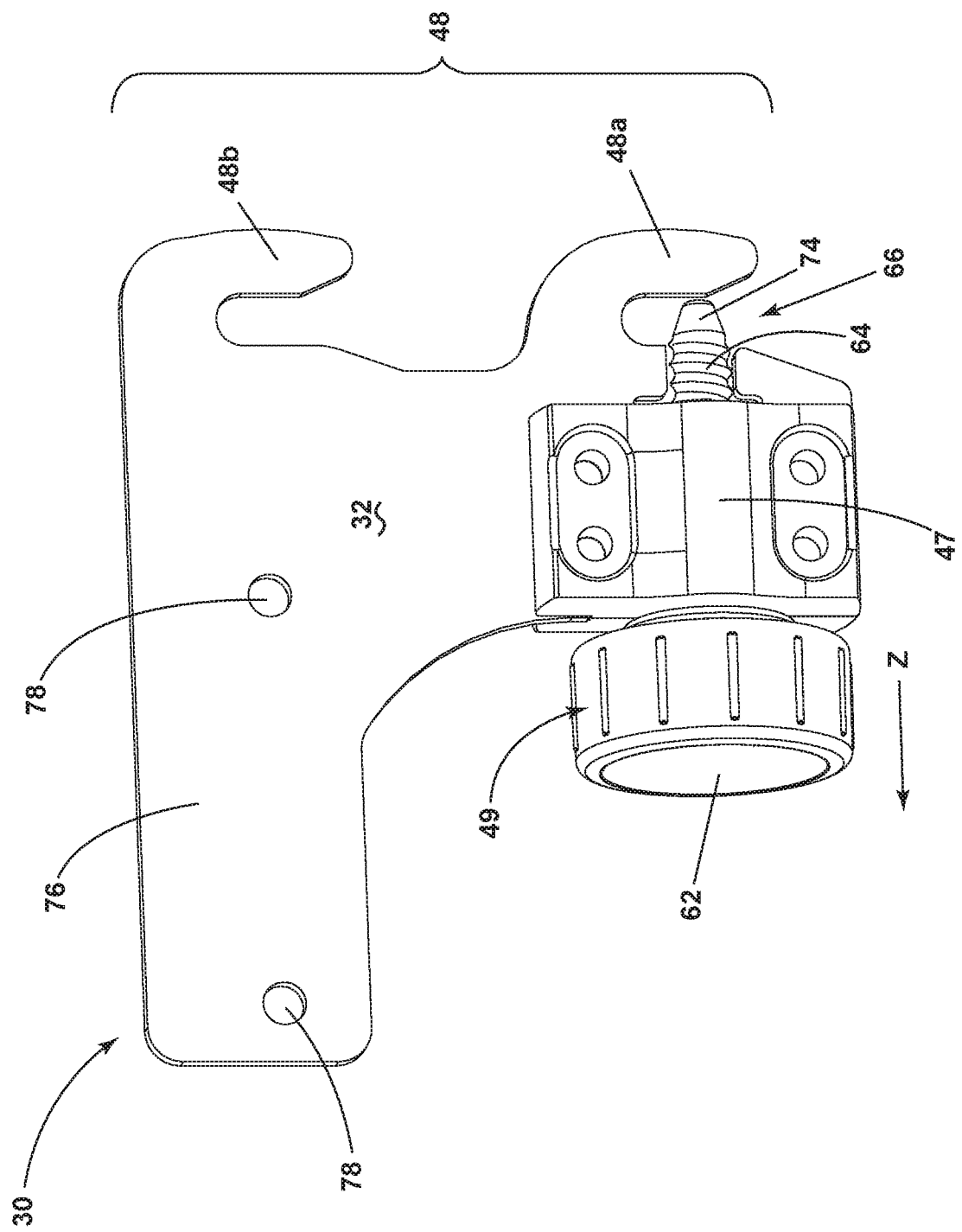
FIG. 5 is a perspective view of one of the brackets from FIG. 2 in a locked position.

FIG. 5 is an enlarged perspective view of the bracket 30 with the retaining device 49 in the locked position 66. The retaining pin 64 can terminate in a tapered end 74 for smooth engagement with the set of vertically-spaced pins 48 (FIG. 3). The body 32 of the at least one bracket 30 can further include a mounting flange 76 having a set of mounting holes 78 through which the pair of bolts 34 (FIG. 3) can be received.

Figure 6:
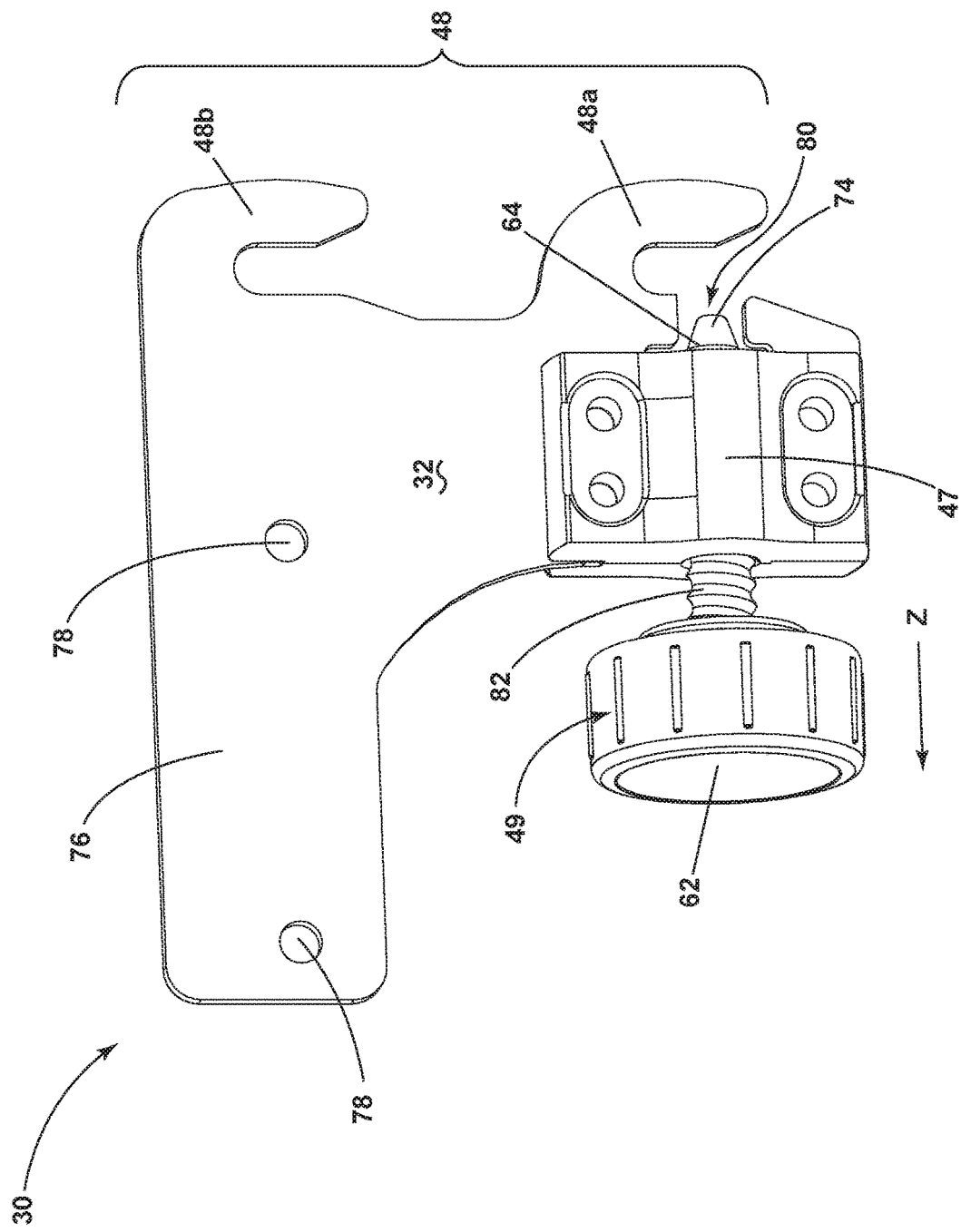
FIG. 6 is a perspective view of one of the brackets from FIG. 2 in an unlocked position.

FIG. 6 is an enlarged perspective view of the bracket 30 with the retaining device 49 in an unlocked position 80. In the unlocked position 80 the retaining pin 64 is moved into the carrier 47 as the knob 62 is moved along the Z direction. In one non-limiting example, the retaining pin 64 includes a threaded portion 82 and is rotationally connected with the knob 62, and wherein the carrier 47 includes a matching threading that receives the threaded portion 82. In this sense, the knob 62 can be rotated to urge, or otherwise cause the movement of the retaining pin 64 in the Z direction to operably or effectively engage or disengage the retaining device 49 between the locked and unlocked positions 66, 80, for example, depending on the clockwise or counterclockwise rotation of the knob 62.

Figure 7:
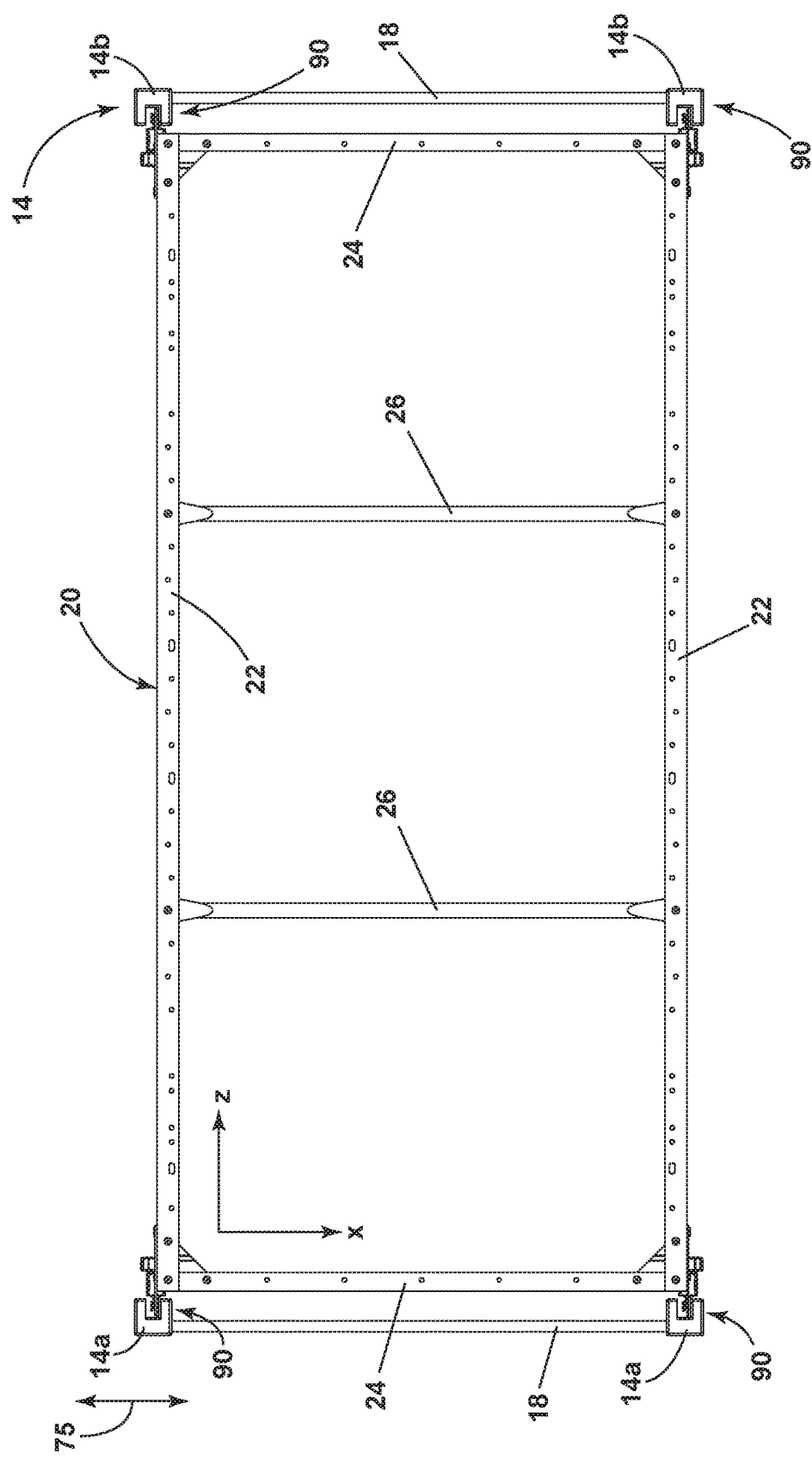
FIG. 7 is a top view of the adjustable furniture track system according to an aspect of the disclosure herein.

FIG. 7 is a top view of the adjustable bed 12. According to an aspect of the disclosure herein, the set of vertically-spaced pins 48 can be arranged on a common side 90 of the interior wall 55, more specifically on one of the sidewalls 55b. Stated another way, each pin 48 of the set of vertical supports 14 (e.g. all four vertical supports 14, in the example of a loft-style bed) can extend laterally in a common direction, from a common-facing sidewall 55b. When arranged as such, the mattress support 20 can be disengaged from the set of vertically-spaced pins 48 in its entirety and moved into the vertically extending movement track 16b in a single lateral shift, by way of non-limiting example in the −X direction.

Figure 8:
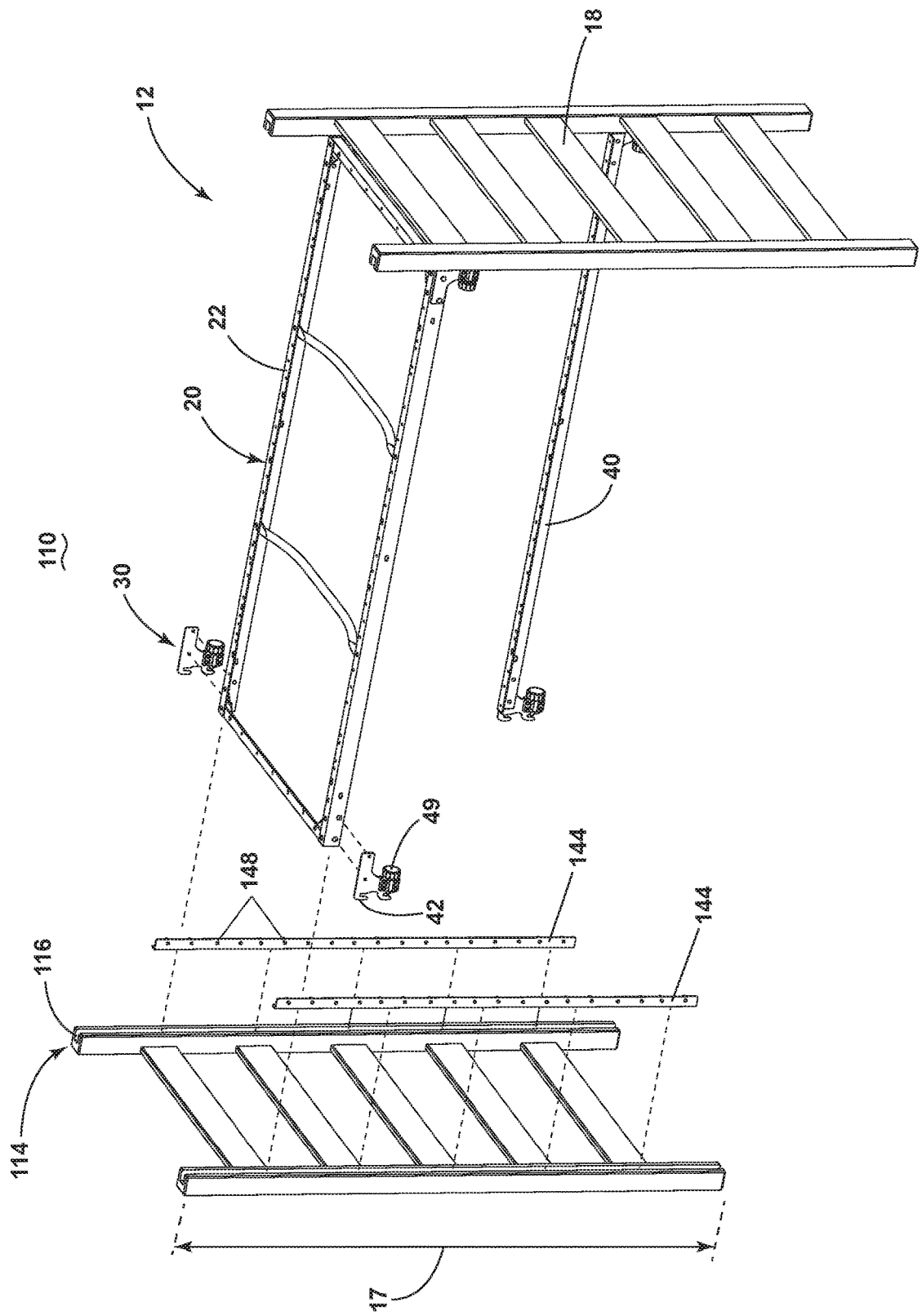
FIG. 8 is a partially exploded view of the adjustable furniture system with brackets and support track segments exploded away from the bed frame according to another aspect of the disclosure herein.

FIG. 8 is a partially exploded view of an adjustable furniture system 110 according to another aspect of the disclosure discussed herein. The adjustable furniture system 110 is substantially similar to the adjustable furniture system 10. Therefore, like parts will be identified with like numerals increased by 100, with it being understood that the description of the like parts of the adjustable furniture system 10 applies to the adjustable furniture system 110 unless otherwise noted.

In the adjustable furniture system 110 support tracks 144 are shown exploded from a channel 116 within a set of vertical supports 114. The support tracks 144 can be multiple support tracks 144 in the form of L-brackets extending along a full length 17 of the set of vertical supports 114. Each support track 144 can include a set of vertically-spaced pins 148 extending inward along the X direction. The set of vertically-spaced pins 148 can extend along the full length 17 of the set of vertical supports. As shown, each respective vertically-spaced pin 148 can be equally spaced from vertically adjacent pins 148, such that the bracket 30 or set of connectors 42 can be connectable to any corresponding set of vertically-spaced pins 148 matching the set of connectors 42 (e.g. any two adjacent pins 148 can be engaged with two corresponding connectors 42 of a single bracket).

A method of manufacturing the adjustable furniture system 10 can include forming one or more of the vertical channels 16 in the set of vertical supports 14 to define a lateral opening 50 and the opposing sidewalls 55b. Forming of the vertical channel 16 can be done using known machining processes, by way of non-limiting example, routing. The method further includes connecting the set of vertically-spaced pins 48 within the vertical channel 16, by way of non-limiting example by first connecting the at least one support track 44 within the vertical channel 16.

It is contemplated that the connecting can include mounting the support track 44 to the mounting surface 55a within the vertical channel 16 as described herein. It is also contemplated that the mounting is performed such that the set of vertical pins 48 extends from a common one of the opposing sidewalls 55b. The method also includes forming a vertically extending movement track 16b within the at least one vertical channel 16 along of the opposing sidewalls 55b.

Furthermore, the method can include forming at least one bracket 30 with a set of connectors 42 receivable through the lateral opening 50 within the vertically extending movement track 16b and configured to engage with the set of vertically-spaced pins 48. The forming of the bracket 30 can include it with the carrier 47 for holding the retaining device 49 movable in the Z direction between the locked and unlocked position 66, 80. The locked position 66 engages the retaining device 49 along the underside 68 of at least one pin 48b of the set of vertically-spaced pins 48 to lock the at least one bracket 30 to the set of vertical supports 14.

The method can further include forming at least one bed end 19, 21 comprising the vertical supports 14 wherein the lateral opening 50 of the channels are parallel-facing. The method can further include forming the side rails 22 having the two bed ends 19, 21 each of which is connected to the bracket 30 via the mounting flange 76. The method can further include forming other modular parts of the adjustable furniture system 10, including but not limited to the pair of end rails 24 and stabilizing slats 26 for completing the mattress support 20 and the lateral cross members 18 for completing the adjustable bed 12. The method can further include connecting the mattress support 20 having brackets 30 at each end to the first bed end 19 and the second bed end 21. Additionally the method can further include manufacturing a stabilizer bar 40 for extending between the first and second pair of vertical supports 14a, 14b.

Benefits associated with the adjustable furniture system described herein include allowing a user to adjust the adjustable furniture system single-handedly. The user can move the retaining device between the first and second position and then slide the bracket up and down the set of vertical supports to a desired height. In utilizing the stabilizer bar as described herein, the user can move the retaining device between the first and second position for more than one bracket and adjust an entire side rail accordingly up and down the channels.

To the extent not already described, the different features and structures of the various embodiments may be used in combination with each other as desired. That one feature may not be illustrated in all of the embodiments is not meant to be construed that it may not be included, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An adjustable furniture track system comprising:
   a set of vertical supports extending in a substantially vertical direction and including at least one vertical channel defining a lateral opening and defining an interior wall within;
   a set of vertically-spaced pins connected with the interior wall, the set of vertically-spaced pins extending in a lateral direction less than the lateral opening; and
   at least one bracket including a set of connectors receivable in the at least one vertical channel and configured to engage with the set of vertically-spaced pins;
   wherein the at least one bracket is laterally movable within the at least one vertical channel between a first position wherein the set of connectors is engaged with and supported by the set of vertically-spaced pins, and a second position wherein the at least one bracket is vertically movable within the at least one vertical channel past the set of vertically-spaced pins.

2. The adjustable furniture track system of claim 1 wherein the at least one bracket further comprises a retaining device movable in a horizontal direction between a locked and an unlocked position.

3. The adjustable furniture track system of claim 2 wherein the retaining device is held by a carrier coupled to the at least one bracket.

4. The adjustable furniture track system of claim 1 further comprising a set of support tracks from which the set of vertically-spaced pins extend.

5. The adjustable furniture track system of claim 4 wherein the set of support tracks are vertically spaced from each other.

6. The adjustable furniture track system of claim 5 wherein the set of vertically-spaced pins are vertically spaced at a first predetermined distance and the set of support tracks are vertically spaced at a second predetermined distance.

7. The adjustable furniture track system of claim 1 wherein the set of connectors are configured to allow vertical disengagement of the at least one bracket from the set of vertically-spaced pins.

8. The adjustable furniture track system of claim 1 wherein the at least one vertical channel defines a vertically extending support pin track at least partially impeded by the set of vertically-spaced pins.

9. The adjustable furniture track system of claim 8 wherein the at least one vertical channel defines a vertically extending movement track not impeded by the set of vertically-spaced pins.

10. The adjustable furniture track system of claim 9 wherein the at least one bracket is vertically moveable within the vertically extending movement track while in the second position.

11. The adjustable furniture track system of claim 10 wherein the set of vertical supports includes four vertical supports including a first pair of parallel vertical supports defining a head section, a second pair of vertical supports defining a foot section, and oriented such that the lateral openings of the channels face the opposing head/foot sections to form a loft-style bed frame.

12. The adjustable furniture track system of claim 11 wherein the at least one bracket is four brackets coupled to a pair of side rails and together with a pair of end rails forms a mattress support vertically moveable within the loft-style bed frame.

13. The adjustable furniture track system of claim 12 wherein the set of vertically-spaced pins are arranged on a common lateral side of the interior wall of the four vertical supports.

14. The adjustable furniture track system of claim 13 wherein the mattress support can be laterally shifted between the support pin track and the movement track.

15. The adjustable furniture track system of claim 1 wherein the at least one vertical channel extends along a full length of the set of vertical supports.

16. The adjustable furniture track system of claim 1 wherein the set of vertically-spaced pins include at least one pin terminating in a boss configured to prevent lateral disengagement of the at least one bracket.

17. A method of manufacturing an adjustable furniture system, the method comprising:
    forming a vertically extending channel in a vertically extending support, the channel defining a lateral opening and opposing sidewalls; and
    connecting a set of vertically-spaced pins that extend laterally within the vertical channel, wherein the set of vertically-spaced pins do not fully extend between the opposing sidewalls, defining a continuous vertically extending movement track of the vertically extending channel.

18. The method of claim 17 further comprising forming at least one bracket with a set of connectors receivable through the lateral opening within the vertically extending movement track and configured to engage and disengage with the set of vertically-spaced pins.

19. The method of claim 18 wherein the at least one bracket can be laterally transitioned to the vertically extending movement track of the vertically extending channel while disengaged, and free to move vertically along the vertically extending movement track.

20. The method of claim 19 further comprising forming the at least one bracket with a carrier for holding a retaining device movable between a locked position and an unlocked position, wherein, when the at least one bracket is engaged with the set of vertically-spaced pins, the locked position engages the retaining device along an underside of at least one pin of the set of vertically-spaced pins to retain the at least one bracket relative to the vertical support.

\* \* \* \* \*

UNITED STATES PATENT AND TRADEMARK OFFICE
CERTIFICATE OF CORRECTION

PATENT NO. : 10,806,269 B2
APPLICATION NO. : 15/958673
DATED : October 20, 2020
INVENTOR(S) : Christopher R. Baden, Joshua D. Storrer and Anthony J. Warncke Page 1 of 1

It is certified that error appears in the above-identified patent and that said Letters Patent is hereby corrected as shown below:

On the Title Page

Item (72) Inventor name Anthony D. Warncke should be Anthony J. Warncke

Signed and Sealed this
Twelfth Day of January, 2021

Andrei Iancu
*Director of the United States Patent and Trademark Office*